May 12, 1959     R. V. LA VEZZI     2,885,925
APERTURE PLATES FOR MOTION PICTURE MACHINES
Filed Oct. 20, 1954
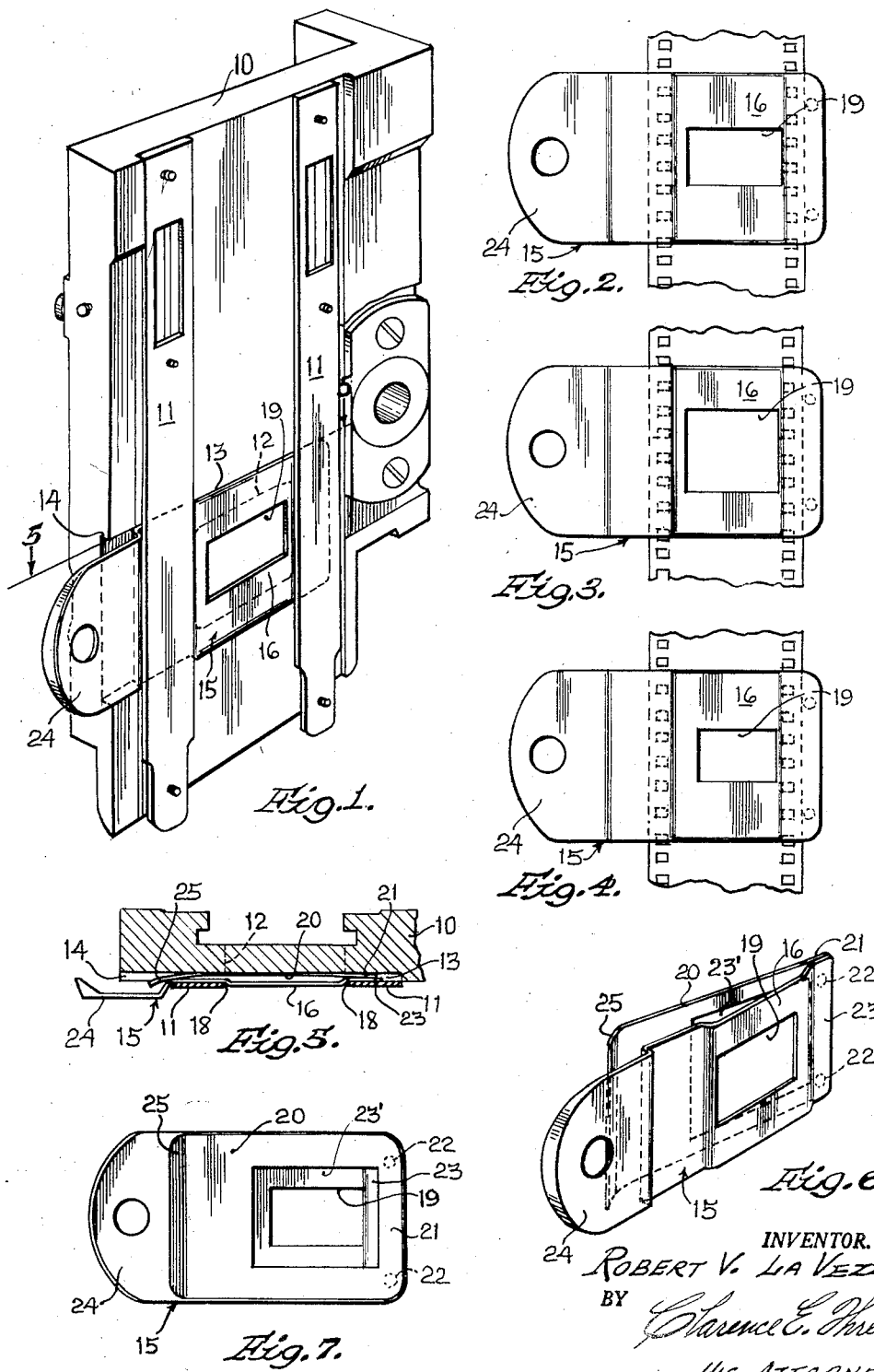
INVENTOR.
ROBERT V. LA VEZZI
BY
HIS ATTORNEY.

United States Patent Office 2,885,925
Patented May 12, 1959

2,885,925

APERTURE PLATES FOR MOTION PICTURE MACHINES

Robert V. La Vezzi, Elmwood Park, Ill., assignor to La Vezzi Machine Works, Chicago, Ill., a copartnership Application October 20, 1954, Serial No. 463,379

1 Claim. (Cl. 88—17)

This invention relates to certain new and useful improvements in aperture plates for motion picture machines.

An object of the invention is the provision of an aperture plate having a spring means for yieldably retaining the same in the recess of a film guide plate of a motion picture projecting apparatus.

It is the present practice to employ the same picture projecting machine for projecting upon a screen a standard or regulation size picture as well as a larger picture known in the field as a "Cinemascope" picture. While this is readily accomplished by the use of the same machine, the difficulty arises in mounting in the machine an aperture plate having the required size of aperture. In the case of a "Cinemascope" picture, the aperture is relatively large as compared with the size of the aperture for the projection of other pictures. The changeover from the large aperture for a "Cinemascope" picture to a small aperture, or vice versa, must be done with speed and effectiveness. In order to do this, the aperture plate must be readily removable from the projecting machine without the use of tools or other instruments and without the necessity of unscrewing or moving attaching levers and the like. It is not unusual in the use of the present-day aperture plates that much delay and annoyance is encountered by reason of the fact that the operator finds it difficult to remove the aperture plate to substitute therefor one having a different size opening. This annoyance and delay is augmented where the operator is called upon to employ tools or to unscrew connecting elements in order to first be able to remove the aperture plate.

An object of this invention is to provide an aperture plate which can be readily mounted and removed from the recess provided therefor in the film guide plate of the picture projecting machine, with the minimum degree of effort and without any appreciable loss of time and without the use of tools.

A further object of the invention is to provide an aperture plate which is yieldably held in the recess thereof provided by the film gate or guide plate of the machine, in a manner such that the same can be removed by merely applying slight manual exertion in withdrawing the same.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a conventional film guide plate of a motion picture projecting machine, showing my improved aperture plate associated therewith;

Figs. 2 to 4 inclusive are elevational views of aperture plates embodying my invention, showing the same with different sizes of apertures;

Fig. 5 is a fragmentary sectional detail view taken substantially on line 5—5 of Fig. 1;

Fig. 6 is a perspective view of the aperture plate embodied in my invention;

Fig. 7 is a rear elevational view of the same.

The conventional motion picture projecting apparatus includes a film guide plate. Such a plate is indicated in Fig. 1 by the numeral 10 and comprises parallelly arranged spaced guide bars 11 between which a film is adapted to move across an opening 12. In this plate is a transverse recess 13 having an entrance 14 at one side edge of the plate 10. The recess 13 extends to the rear of the guide bars 11. In this recess is mounted what is known in the art as an "aperture plate."

My improved aperture plate comprises a main plate 15 of substantially rectangular formation and having a medial portion 16 offset slightly with respect to the end portions thereof for positioning between the adjacent long edge portions 18 of the side bars 11. The main plate 15 provides an aperture 19 which is in the plane of registration with the aperture or opening 12. The size of this aperture 19, as shown in Figs. 2 to 4 inclusive, will vary according to the size of the picture to be projected.

My improved aperture plate further includes a spring plate 20, one edge 21 of which is fixedly secured as at 22 to an edge 23 of the main plate 15. This spring plate 20 is normally flexed from its position of engagement with the main plate 15, as shown in Fig. 6. The spring plate 20 is provided with an aperture 23' of a size larger than that of the aperture 19 and located in the plane of registration with the aperture 19.

The main plate 15 provides an extension 24 from the edge thereof opposite the edge secured to the spring plate 20. This extension 24 provides a finger grip and is offset with respect to the side plane of the main plate 15, as shown in Fig. 6. When the aperture plate is mounted in the recess 13, this finger grip is located at one side of the film guide plate 10, where it can be conveniently and firmly grasped by the fingers of the operator. The spring plate 20 has its edge 25 curved laterally to eliminate a sharp edge which otherwise might interfere with removal of the aperture plate from the recess 13.

When my improved aperture plate is arranged in the recess 13, the spring plate 20 will be flexed against the main plate 15 and yieldably retain the aperture plate within the recess 13, with the offset medial portion 16 thereof disposed flush with the guide bars 11. To remove the aperture plate from the recess 13 it only requires the operator to firmly grip the finger grip 24 and exert a sufficient pulling force on the aperture plate. When mounted in the recess, the aperture plate 20 will be rigidly held with its medial portion disposed between the guide bars 11 by the spring plate 20.

An aperture plate constructed in accordance with the foregoing description is capable of being removed from its recess provided by the film guide plate, quickly, with the least amount of effort and without the use of tools or other implements. As is apparent, the aperture plate may be economically manufactured.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An aperture plate for motion picture projecting machines comprising a substantially V-shaped body including a main plate and a flexible substantially flat spring plate with said main plate being of a length greater than said spring plate, said main plate having a medial portion thereof offset with respect to the end portions thereof, said medial portion having an opening formed therein, said spring plate having an opening therein in registration with a like opening in the motion picture projecting machine and in registration with the opening of said main plate, said plates being compressible into spaced confronting relation with respect to each other for frictional operative connection to said motion picture projecting machine with said spring plate being in substantially flat facial abutment with said machine and with the medial portion of said main plate in spaced confronting relation with respect thereto, said main plate having an extension from the edge thereof opposite the edge secured to the spring plate to provide a finger grip, said extension being offset with respect to the side of the main plate opposite the side to which said spring plate is secured, and said spring plate having a curved edge portion opposite the edge portion secured to said main plate and curved in a direction for positioning to the rear of the extension when said spring plate is in flat engagement with said main plate.

References Cited in the file of this patent

UNITED STATES PATENTS

| Number | Name | Date |
|---|---|---|
| 126,657 | Weir | May 14, 1872 |
| 492,131 | Adams | Feb. 21, 1893 |
| 1,180,958 | Tilton, Jr. | Apr. 25, 1916 |
| 1,522,395 | Thomas | Jan. 6, 1925 |
| 1,869,852 | Kindelmann | Aug. 2, 1932 |
| 1,981,033 | Dina | Nov. 20, 1934 |
| 2,144,209 | Vollenweider | Jan. 17, 1939 |
| 2,198,169 | Kallusch | Apr. 23, 1940 |
| 2,249,228 | Rogers | July 15, 1941 |